Patented Nov. 6, 1923.

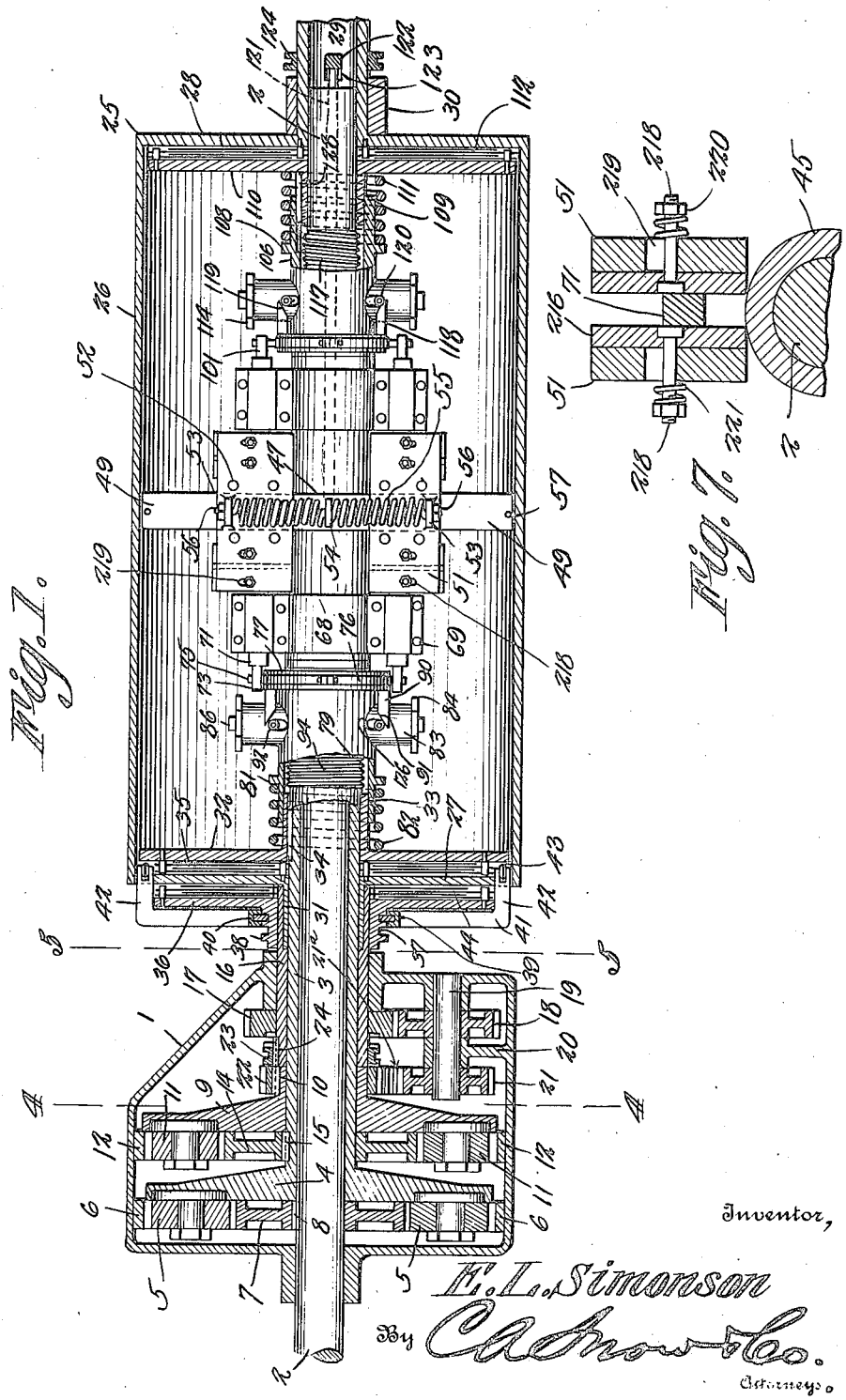

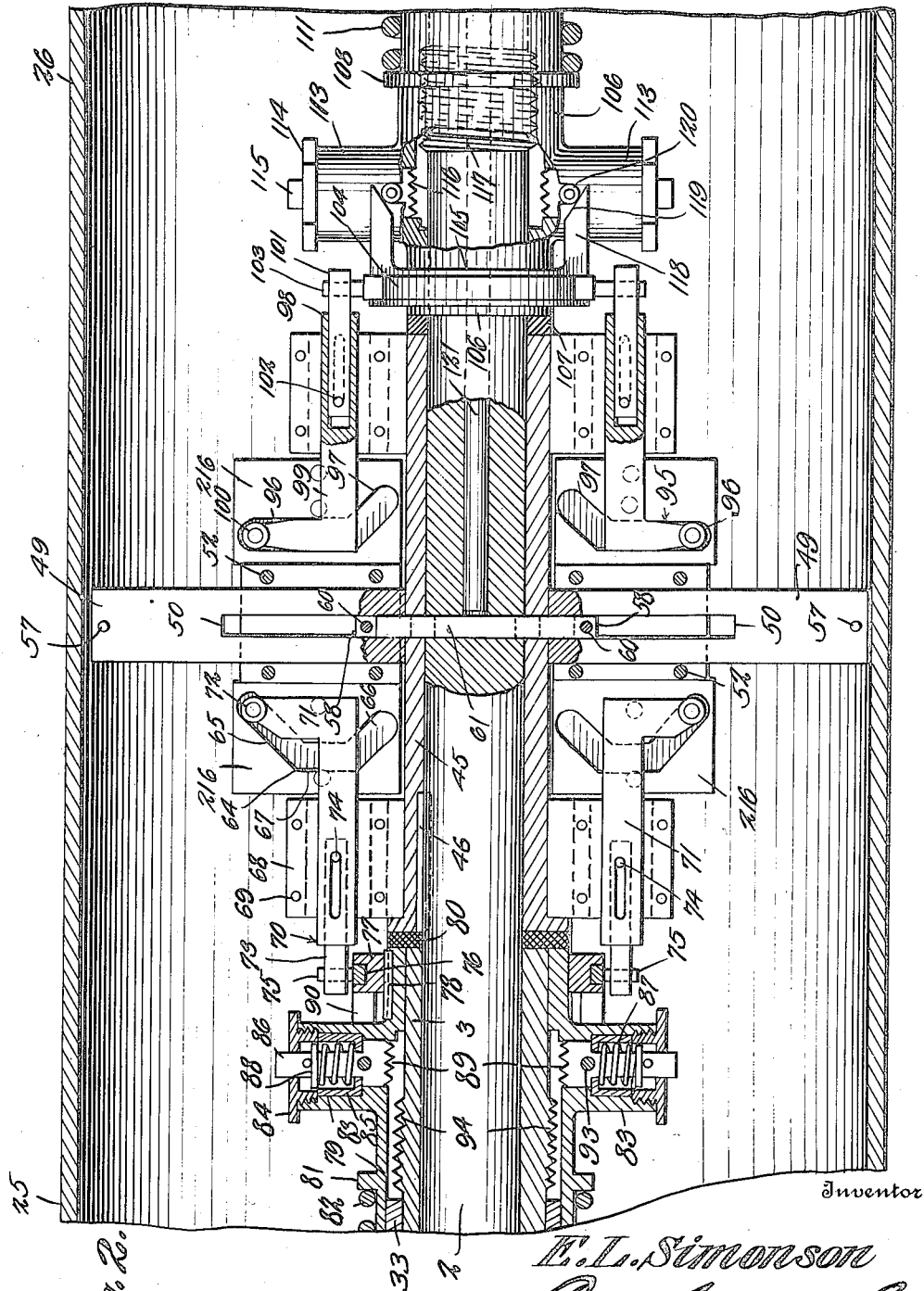

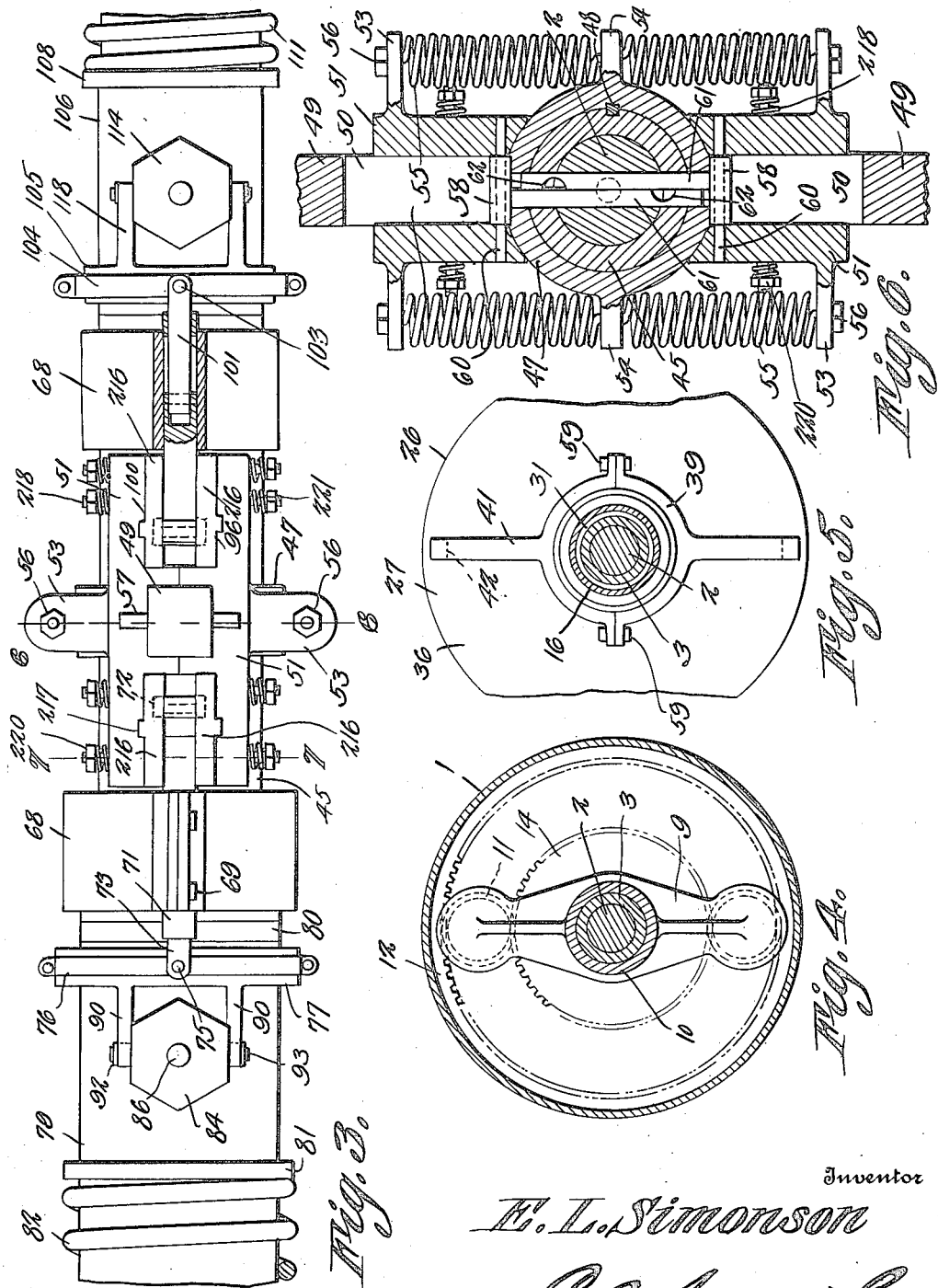

1,473,128

UNITED STATES PATENT OFFICE.

ELMER L. SIMONSON, OF HOMESTEAD, PENNSYLVANIA.

GEAR CONTROL.

Application filed May 25, 1921. Serial No. 472,375.

*To all whom it may concern:*

Be it known that I, ELMER L. SIMONSON, a citizen of the United States, residing at Homestead, in the county of Allegheny and State of Pennsylvania, have invented a new and useful Gear Control, of which the following is a specification.

The device forming the subject matter of this application is adapted to be used on motor propelled vehicles, and embodies a transmission mechanism and means for shifting the gears or otherwise effecting the usual change from low into second, and from second into high, as well as backwardly from high toward low.

The invention aims to provide novel means whereby the change is brought about automatically, responsive to changes in the speed of rotation in the engine shaft.

A further object of the invention is to improve the transmission, per se.

Another object of the invention is to provide novel means for locking the mechanism, so that it cannot respond automatically to changes of engine speed.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:—

Figure 1 shows in longitudinal section, a device constructed in accordance with the invention, parts appearing in elevation; Figure 2 is an enlarged longitudinal sectional detail disclosing parts of the shifting mechanism; Figure 3 is an enlarged plan view, wherein parts appear in section; Figure 4 is a cross section taken approximately on the line 4—4 of Figure 1; Figure 5 is a cross section taken approximately on the line 5—5 of Figure 1; Figure 6 is a transverse section showing the inertia weights or slides, together with sundry parts which cooperate with them; and Figure 7 is a sectional detail showing the slides and attendant parts.

The device forming the subject matter of this application embodies a transmission mechanism, and a means responsive to speed changes for shifting the gears of the transmission. Various forms of transmissions may be used with the gear shifting means, but, in order to present a complete and operative embodiment of the invention, the transmission will be described in detail.

The transmission includes a gear casing 1 wherein an engine shaft 2 is journaled. A sleeve 3 is mounted rotatably on the shaft 2 and carries a cross arm 4, whereon pinions 5 are journaled. The pinions 5 mesh into an internal gear ring 6 carried by the casing 1, the pinions meshing, likewise, with a gear 7 keyed at 8 to the shaft 2. The numeral 9 marks a cross arm like the part 4, but carried by a hub 10 rotatable on the sleeve 3. Pinions 11 are journaled on the arm 9 and mesh into an internal gear ring 12 carried by the casing 1, the pinions meshing, further, with a gear wheel 14 which is keyed at 15 to the sleeve 3.

A sleeve 16 is rotatable on the sleeve 3 and is journaled in the rear end of the casing 1. A gear wheel 17 is loose on the sleeve 16 and meshes into a pinion 18 carried by a stub shaft 19, rotatable in the casing 1 and in a bearing 20 located within the casing. A pinion 21 is fixed to the stub shaft 19 and meshes with an intermediate gear 21ª, supported rotatably on the casing and meshing into a gear wheel 22 secured to the hub 10 which carries the arm 9. A clutch collar 23 is splined at 24 to the sleeve 16, to slide therealong, the clutch collar being under the control of an operator and serving to couple either the gear wheel 22 or the gear wheel 17 to the sleeve 16.

Passing from the transmission mechanism to the gear shifting means, there appears in the drawings, a rotatable member in the form of a drum 25, embodying a shell 26, a forward end wall 27 and a rear end wall 28, the wall 28 being provided with a tubular shaft 29 journaled in a bearing 30, supported in any desired way. It is from the shaft 29 that the power ultimately is delivered, the power being derived from the engine shaft 2. The engine shaft 2 extends lengthwise of the drum 25 and enters the shaft 29 of the drum.

The forward end wall 27 of the drum 25 has a hub 31, extended within the end of the sleeve 16 and surrounding the sleeve 3, there being no rigid connection between the hub 31 and the parts 16 and 3. A disk 32 is disposed within the drum 25, in the rear of the forward end wall of the drum, the disk having a neck 33 surrounding the sleeve 3 and splined at 34 to the sleeve, the construction being such that the disk 32 may be moved toward and away from the end wall 27 of the drum. A clutch, of the disk type, ordinarily, and denoted by the numeral 35, forms an operative connection between the disk 32 and the end wall 27 of the drum.

A disk 36 is located outwardly of the wall 27 of the drum 25 and includes a hub 37 rotatable upon the sleeve 16. The disk 36 may be moved toward the end wall 27 of the drum by any suitable means, the hub 37 of the disk being adapted, as indicated at 38, for the reception of mechanism under the control of an operator for shifting the disk. The hub 37 of the disk 36 is journaled in a two-part ring 39 (Figure 5), the constituent members of which are connected as shown at 59. The ring 39 is keyed at 40 to the hub 37 of the disk 36, the construction being such that, although the hub may rotate in the ring, the hub and the ring are, nevertheless, connected for movement together, longitudinally of the shaft 2. The ring 39 has radial arms 41 terminating in rearwardly extended fingers 42 passing through the end wall 27 of the drum 25. Rollers 43 are journaled on the fingers 42 and are adapted to cooperate with the disk 32 in a way which will be set forth hereinafter. A clutch 44, preferably of the disk type, forms a connection between the sleeve 16 and the disk 36, and is interposed between the disk 36 and the end wall 27 of the drum.

As shown in Figure 2, a tubular member 45 surrounds the shaft 2 within the drum 25 and is keyed to the shaft, as shown at 46. A ring 47 is disposed about the tubular member 45, the parts 47 and 45 being connected by a key 48 or otherwise, as indicated in Figure 6. Guides 49, in the form of posts, project from the ring 47 and are provided with slots 50. Main slides 51, in the form of inertia governor weights, are mounted for reciprocation on the guides or posts 49. For convenience in assembly, each of the slides 51 may be made in two parts, united by securing elements 52. Ears 53 outstand from the slides 51, the ring 47 being supplied with ears 54. Retractile springs 55 connect the ears 54 and 53, and are secured thereto as shown at 56. The function of the springs 55 is to restrain the outward sliding movement of the members 51 on the guides 49 when the tubular member 45 is rotated with the shaft 2. It may be expedient to place stop pins 57 in the guides 49 to limit the outward movement of the slides 51, should the springs 55 break.

A pair of keepers is provided, the keepers being shown most clearly in Figure 6. Each keeper embodies a head 58 and a stem 61 projecting therefrom. The heads 58 of the keepers are received slidably in the slots 50 of the guides 49 and are secured to the slides 51, as shown at 60. The stems of the keepers are overlapped on each other, and pass slidably through the ring 47, the tubular member 45 and the shaft 2. In the inner edges of the stems 61 of the keepers, seats 62 are fashioned. When the keepers are carried outwardly far enough, by the action of the slides 50, the seats 62 in the stems of the keepers are disposed opposite to each other and form an opening, adapted to receive a latch pin 121, mounted for longitudinal sliding movement in the shaft 2 and connected to a cross piece 122, (Figure 1) movable in an opening 123 formed in the shaft 29 of the drum 25. A shift ring 124 is slidable on the shaft 29 and constitutes means for moving the cross piece 122 and the latch pin 121 with respect to the seats 62 (Figure 6) in the stems 61 of the keepers. The function and the utility of the mechanism described in this paragraph will be made manifest hereinafter.

Auxiliary slides 216 are mounted for reciprocation in the main slides 51, the slides 216 and 51 being tongue and grooved together for relative sliding movement, as at 217. Fingers 218 project outwardly from the auxiliary slides 216 and are received in elongated slots 219 in the main slides 51, the construction being such that the slides 51 may have a limited amount of outward movement, centrifugally, before they pick up the slides 216 and carry the slides 216 outwardly. Nuts 220 are mounted on the ends of the fingers 218, and compression springs 221 are carried by the fingers, the springs abutting against the nuts 220 and against the slides 51.

The slides 216 have cam grooves 64. As shown in Figure 2, each cam groove 64 embodies angularly disposed parts 65 and 66, and a connecting part 67 which is located at right angles to the axis of the shaft 2. The numeral 68 designates a two-part guide mounted on the tubular member 45, the parts of the guide being united by securing elements 69.

A telescopic operating member 70 is provided, the same including an angular part 71, slidable in the guide 68 and received between the slides 216, there being one operating member for each of the cam grooves 64, the part 71 having projections, such as rollers 72, received in the cam grooves 64. The telescopic operating member 70 embodies a part 73, slidable in the part 71 and united thereto by a lost motion connection 74, which may be in the form of a pin and slot.

The parts 73 of the operating members 70 are connected at 75 to a ring 76 received rotatably in a ring or carrier 77 splined at 78 upon a sleeve 79 to slide therealong, the sleeve being rotatable on the sleeve 3. The sleeve 79 is mounted for longitudinal movement, and cooperates with a buffer 80 surrounding the shaft 2 and disposed between the parts 3 and 45. There is a flange 81 on the sleeve 79, a compression spring 82 surrounding one end of the sleeve and abutting against the flange and the disk 32.

The sleeve 79 is provided with oppositely extended tubular projections 83 whereon caps 84 are threaded, the caps retaining bushings 85 within the parts 83. Latches 86 are slidable in the caps 84, the bushings 85 and the tubular projections 83. Compression springs 87 engage abutments 88 on the latches 86 and engage the bushings 85. Threads 89 are formed on the inner ends of the latches and are adapted to cooperate with threads 94 on the sleeve 3. The carrier or ring 77 has arms 90 beveled at their ends, as at 91, to engage with rollers 92 on cross pins 93 mounted in the latches 86, the tubular projections 83 having elongated slots 126 formed in their sides to permit movement of the cross pins and the latches.

Referring to Figure 2, it will be observed that to the right of the guides or posts 49, there is a combination of parts substantially duplicating those last above described. The parts to the right of the guides 49 may be dismissed with a brief catalogue description.

The slides 216 are provided with cam grooves 95, the outer portions 96 of which are disposed at right angles to the axis of the shaft 2, the inner portions of the cam grooves slanting, as shown at 97, at an angle to the outer portions 96, the said portions 97 being disposed approximately parallel to the parts 66 of the cam grooves 64. The telescoping operating members are shown at 98 and embody angular parts 99 having rollers 100 received in the cam grooves 95. The members 101 are slidably mounted in the parts 99 and are connected thereto by a lost motion pin and slot joint 102. The parts 101 of the operating members 98 are connected at 103 to a ring 104 journaled on a carrier ring 105 connected, like the ring 77, to a sleeve, the sleeve of the ring 105 being denoted by the numeral 106. A buffer 107 is located at the end of the tubular member 45 and constitutes an abutment for the sleeve 106, which is provided with a flange 108 and receives the hub of a disk 110, the hub of the disk being marked by the numeral 109 and being splined at 128 to the shaft 2. A spring 111 is interposed between the flange 108 and the disk 110. A clutch 112 which may be of disk form, constitutes a connection between the member 110 and the wall 28 of the drum 25.

The tubular projections of the sleeve 106 appear at 113 and carry caps 114, like the parts 84, the latches being shown at 115 and having threads 116 adapted to coact with threads 117 on the shaft 2. Arms 118 project from the carrier ring 105 and are beveled at 119 to coact with roller projections 120 on the latches 115.

*Operation.*

The clutch collar 23 is moved into engagement with the gear wheel 22, thereby connecting the gear wheel to the sleeve 16. The disk 36 is moved by means of its hub 37 and any suitable operating mechanism, (not shown), until the clutch 44 forms a connection between the disk 36 and the end 27 of the drum 25, so that when the disk is rotated the drum will be rotated likewise.

When the parts are arranged as above described, there is established a low gear driving train embodying the shaft 2, the gear 7, the pinions 5, the gear ring 6, the cross arm 4, the gear 14, the pinions 11, the gear ring 12, the cross arm 9, the gear wheel 22, the clutch collar 23, the sleeve 16, the clutch 44, the end wall 27 of the drum 25, the end wall 28 of the drum, and the shaft 29, the shaft 29 being rotated in low gear.

As the speed builds up from low toward second, the following operation takes place.

Responsive to the rotation of the drum, the weights or slides 51 move outwardly on the guides 49, the springs 55 being put under tension. The slides 51 pick up the slides 216 when the fingers 218 arrive at the outer ends of the slots 219. The rollers 72 on the members 71 travel in the parts 65 of the cam slots 64 in the slides 216 and arrive in the parts 67 of the cam slots. The operating members 70 move to the left (Figure 2) and carry the rings 76 and 77 to the left, the arms 90 being carried to the left and the bevel ends 91 of the arms cooperate with the rollers 92 on the cross pins 93 to carry the latches 86 inwardly, whereby the threads 89 on the latches are so disposed as to engage with the threads 94 on the sleeve 3 when the sleeve 79 is moved to the left. The sleeve 79 is moved to the left by the engagement between the carrier ring 77 and the tubular projections 83. When the sleeve 79 moves to the left, the spring 82 is compressed, the disk 32 being carried to the left, and the clutch 35 coupling the disk 32 to the end wall 27 of the drum 25. When the disk 32 moves to the left, it engages with the rollers 43 on the fingers 42, the arms 41, the ring 39 and the disk 36 being carried to the left, the hold of the clutch 44 being loosened.

Now there is established a driving train embodying the shaft 2, the gear 7, the pinions 5, the gear ring 6, the cross arm 4, the sleeve 3, the spline 34, the neck 33 of the disk 32, the disk 32, the clutch 35, the end wall 27 of the drum 25, the shell 26 of the drum, the end wall 28 of the drum, and the shaft 29 of the drum, the shaft 29 being operated in "second," so called, because, as hereinbefore explained, the clutch 44 has been thrown out automatically and the clutch 35 thrown in automatically. The purpose of the lost motion connection at 74 is to permit the sleeve 79 to be carried to the left by the ring 77 after the ring 77 has moved to the left far enough to permit the beveled ends 91 of the parts 90 to move the latches 86 inwardly.

As to speed increases, the transition from second to high is made. The rollers 72 enter the parts 66 of the cam grooves 64, and the members 70 are drawn to the right (Figure 2) thereby moving the beveled ends 91 of the arms 90 out of engagement with the rollers 92 on the latches 86. The latches 86 move outwardly, responsive to the springs 87, the threads 89 on the latches being disengaged from the threads 94 on the sleeve 3. The spring 82 now reacts and restores the sleeve 79 to the position shown in Figure 2, the pressure of the spring 82 on the disk 32 being relieved, and the hold of the clutch 35 on the end wall 27 of the drum 25 being loosened. There is now no driving connection with the left hand end of the drum.

During the operation last above described, and as the slides 51 and 216 move outwardly, responsive to increased speed of rotation of the drum 25, the rollers 100 enter the parts 97 of the cam grooves 95 in the slides 216. The operation then brought about at the right hand end of the device (Figures 1 and 2) resembles the operation hereinbefore described, and may be set forth briefly. The operating members 98 move the latches 115 inwardly, the sleeve 106 is carried to the right, the threads 116 on the latches engage with the threads 117 on the shaft 2, the spring 111 is compressed, the disk 110 renders the clutch 112 operative, and, then, there is established a direct driving connection, in high, between the shaft 2 and the drum 25, the shaft 29 of the drum being rotated.

When the speed of rotation of the engine shaft lessens, the clutch 112 is first thrown out, and simultaneously, the clutch 35 is thrown in. Finally, as the speed decreases, the clutch 35 is thrown out. The clutch 44 is not operated at this time, because, it will be recalled, the clutch 44 is set by the operator, through the instrumentality of the hub 37 on the disk 36, the clutch 44 having been thrown out at the time that the clutch 35 is thrown in automatically, during the change from low to second.

Suppose that the machine is running in second and that the speed of rotation of the engine shaft 2 is increased considerably, for any reason, over and above the speed which one normally maintains in second. Under such circumstances, so far as the description has proceeded up to this point, the slides 51 and 216 will move outwardly, automatically placing the mechanism in high, since the change from second to high is brought about by an increased speed of rotation in the shaft 2. A means, however, is provided whereby the operator may hold the mechanism in second, at will.

When it is desired to retain the mechanism in second, the shift ring 124 is moved to the left (Figure 1), carrying with it the cross pin 122 and the latch pin 121, the latch pin entering the seats 62 in the stems 61 of the keepers which are secured to and form part of the slides 51, the seats 62 being opposite to each other, and cooperating to form an opening for the reception of the latch pin, when the mechanism is in second. Clearly, the slides 51 cannot move outwardly, due to their inertia, when they are held by the latch pin 121, and there can be no automatic change from second to high, until the latch pin has been retracted into the position shown in Figure 2 of the drawings.

In case it is desired to effect a reversal, the clutch collar 23 is shifted out of engagement with the gear wheel 22 and into engagement with the gear wheel 17, the gear wheel 17 being coupled to the sleeve 16, and the driving train then including the pinions 18, and 21, 21ª and 22, a reversal being brought about in a way more or less common and well understood by those skilled in the art.

Reverting to Figure 7, it may be stated that since the slides 51 have a limited amount of movement at 218–219 independently of the slides 216, before the slides 216 are moved and the cam slots brought into play, a variation of about 5 miles per hour in car speed, from the point of change between low and second on the one hand, and second and high on the other hand, is permitted, and this variation will compensate for any slight decrease in the speed of rotation of the engine shaft during the change from second into high.

I claim:—

1. In a device of the class described, a driving element; a member rotatable with respect to the driving element; a clutch movable longitudinally of the driving element and adapted to connect the driving element with said member; a sleeve movable longitudinally of the driving element and connected with the clutch; a latch slidable in the sleeve, the latch and the driving element having threads; inertia means responsive to the rotation of the driving element; and mechanism operatively connected with the inertia means to advance the sleeve and to advance the latch, thereby to cause the threads of the latch and of the driving element to interengage and to cause the clutch to form a connection between the driving element and said member.

2. In a device of the class described, a driving element; a member rotatable with respect to the driving element; a clutch movable longitudinally of the driving element and adapted to connect the driving element with said member; a sleeve movable longitudinally of the driving element; a compression spring interposed between the sleeve and the clutch; a latch slidable in the sleeve, the latch and the driving element having threads; inertia means responsive to the rotation of the rotation of the driving element; and mechanism for connecting the inertia means with the sleeve and with the latch, operatively, thereby to advance the sleeve and to advance the latch, to bring the threads of the latch and of the driving element into engagement, the spring being compressed, and operating upon the clutch when the sleeve is advanced.

3. In a device of the class described, relatively rotatable driving elements; a member rotatable with respect to the driving elements; a first clutch carried by one driving element; means responsive to the rotation of said driving element for engaging the clutch with said member; and a second clutch carried by the other driving element and under the control of an operator to engage said member, the second clutch comprising a part cooperating with the first clutch to disengage the same from the rotatable member.

4. In a device of the class described, relatively rotatable driving elements; a member rotatable with respect to the driving elements; a first clutch movable longitudinally of one driving element to connect the same with the rotatable member; a sleeve movable longitudinally of said driving element and connected operatively with the clutch; a latch slidable in the sleeve, the latch and said driving element having threads; inertia means responsive to the rotation of the said driving element; mechanism connecting the sleeve and the latch with the inertia means, to advance the sleeve and to advance the latch, thereby causing the threads of the latch and said driving element to coact; a second clutch under the control of an operator and carried by the other driving element, the second clutch being movable to engage the rotatable member, and including a part cooperating with the first clutch to disengage the first clutch from the rotatable member.

5. In a device of the class described, a plurality of relatively rotatable elements; a member rotatable with respect to said elements; latches carried by two of the rotatable elements and cooperating with the rotatable member; inertia means responsive to the rotation of said elements; mechanism for connecting the inertia means with the clutches to operate the clutches responsive to different speeds; and a third clutch under the control of an operator and carried by a third one of the rotatable elements, the third clutch cooperating with the rotatable member, and including a part coacting with one of the first specified clutches to disengage the same from the rotatable member.

6. In a device of the class described, a driving shaft; a member rotatable with respect thereto; a guide rotatable with the shaft; a weight slidable on the guide; spring means for restraining the outward movement of the weight; a clutch forming a connection between the shaft and the rotatable member; means for actuating the clutch from the weight; a keeper connected to the weight and slidable in the shaft; and a latch slidable in the shaft and cooperating with the keeper to hold the weight against outward movement.

In testimony that I claim the foregoing as my own, I have hereto affixed my signature.

ELMER L. SIMONSON.